United States Patent
Soddu

(10) Patent No.: US 9,534,071 B2
(45) Date of Patent: Jan. 3, 2017

(54) PROCESS FOR THE PREPARATION OF FUNCTIONALIZED AND BRANCHED ELASTOMERIC COPOLYMERS AND USE THEREOF IN VULCANIZABLE ELASTOMERIC COMPOSITIONS

(71) Applicant: Versalis S.P.A., S. Donato Mil.se (IT)

(72) Inventor: Luca Soddu, Bologna (IT)

(73) Assignee: VERSALIS S.P.A. (IT)

( * ) Notice: Subject to any disclaimer, the term of this patent is extended or adjusted under 35 U.S.C. 154(b) by 0 days.

(21) Appl. No.: 14/404,703

(22) PCT Filed: Jun. 10, 2013

(86) PCT No.: PCT/IB2013/054746
§ 371 (c)(1),
(2) Date: Dec. 1, 2014

(87) PCT Pub. No.: WO2013/186691
PCT Pub. Date: Dec. 19, 2013

(65) Prior Publication Data
US 2015/0183913 A1 Jul. 2, 2015

(30) Foreign Application Priority Data

Jun. 12, 2012 (IT) .............................. MO2012A1018

(51) Int. Cl.
| | |
|---|---|
| *C08F 236/10* | (2006.01) |
| *C08C 19/44* | (2006.01) |
| *C08L 15/00* | (2006.01) |
| *C08L 9/00* | (2006.01) |
| *C08L 9/06* | (2006.01) |
| *C08K 3/04* | (2006.01) |
| *C08K 3/36* | (2006.01) |
| *C08F 212/08* | (2006.01) |

(52) U.S. Cl.
CPC ............. *C08F 236/10* (2013.01); *C08C 19/44* (2013.01); *C08K 3/04* (2013.01); *C08K 3/36* (2013.01); *C08L 9/00* (2013.01); *C08L 9/06* (2013.01); *C08L 15/00* (2013.01); *C08F 212/08* (2013.01); *C08F 2810/40* (2013.01)

(58) Field of Classification Search
CPC .... C08F 2810/40; C08F 212/08; C08F 236/10
See application file for complete search history.

(56) References Cited

U.S. PATENT DOCUMENTS

| | | | |
|---|---|---|---|
| 3,637,554 A | 1/1972 | Childers | |
| 5,539,058 A * | 7/1996 | Nicol | ................. C08F 297/044 |
| | | | 525/250 |
| 6,521,712 B1 | 2/2003 | Knoll et al. | |
| 2004/0006187 A1* | 1/2004 | Viola | ..................... C08C 19/00 |
| | | | 526/173 |
| 2006/0241265 A1 | 10/2006 | Harwood et al. | |
| 2007/0173612 A1 | 7/2007 | Bohm et al. | |

FOREIGN PATENT DOCUMENTS

| | | |
|---|---|---|
| EP | 0754710 A2 | 1/1997 |
| EP | 0818478 A1 | 1/1998 |
| EP | 1274737 B1 | 5/2008 |
| WO | 2008119465 A1 | 10/2008 |
| WO | 2010020374 A1 | 2/2010 |

OTHER PUBLICATIONS

International Search Report and Written Opinion dated Sep. 30, 2013 for PCT/IB2013/054746.

* cited by examiner

Primary Examiner — Robert C Boyle
(74) Attorney, Agent, or Firm — Abel Law Group, LLP

(57) ABSTRACT

A process for the preparation of a functionalized and branched elastomeric copolymer comprising the following steps: (a) anionic copolymerization of at least one conjugated diene monomer and at least one vinyl arene, in the presence of at least one hydrocarbon solvent, of at least one lithium-based initiator, and of at least one polar modifier, obtaining a solution comprising an elastomeric copolymer; (b) reacting at least 10% by weight, preferably from 20% by weight to 100 % by weight, of the polymeric chains present in the elastomeric copolymer obtained in step (a) with at least one compound having at least one functional group selected from: epoxides, ketones, esters, aldehydes, obtaining a solution comprising a functionalized elastomeric copolymer; (c) adding a quantity of lithium-based initiator to the solution obtained in step (b), from 1 to 4 times, preferably from 1.5 to 3 times, the molar quantity of lithium-based initiator used in step (a) and a compound of bromine having general formula (I): R—Br (I) wherein R represents a linear or branched $C_1$-$C_{30}$, preferably $C_2$-$C_{10}$, alkyl group, a $C_3$-$C_{30}$, preferably $C_4$-$C_{10}$, cycloalkyl group, a $C_6$-$C_{30}$, preferably $C_6$-$C_{12}$, aryl group.

20 Claims, No Drawings

US 9,534,071 B2

PROCESS FOR THE PREPARATION OF FUNCTIONALIZED AND BRANCHED ELASTOMERIC COPOLYMERS AND USE THEREOF IN VULCANIZABLE ELASTOMERIC COMPOSITIONS

DESCRIPTION

The present invention relates to a process for the preparation of a functionalized and branched elastomeric copolymer and its use in vulcanizable elastomeric compositions.

More specifically, the present invention relates to a process for the preparation of a functionalized and branched elastomeric copolymer which comprises anionic polymerization of at least one conjugated diene monomer and at least one vinyl arene, reacting at least 10% by weight of the polymeric chains present in the elastomeric copolymer obtained with at least a compound having at least one functional group, reacting the functionalized elastomeric copolymer obtained with at least one compound containing bromine.

The functionalized and branched elastomeric copolymer thus obtained has a good processability and can be advantageously used in vulcanizable elastomeric compositions.

A further object of the present invention relates to a vulcanizable elastomeric composition comprising at least one functionalized and branched elastomeric copolymer obtained with the above-reported process.

Said elastomeric composition can be advantageously used in the production of vulcanized end-products, in particular tyres, more specifically tyre treads.

Another object of the present invention therefore relates to a vulcanized end-product comprising the above elastomeric composition.

The processability of elastomeric copolymers is a term which generally indicates a complex behaviour that describes both the incorporation phase of fillers, usually silica, carbon black, or mixtures thereof, in which the characteristics of the elastomeric copolymers play an important role, and the forming phase in which the elastomeric copolymers are required to have a plasticity which is sufficient for producing end-products also having a complex shape.

Scientific literature has demonstrated the importance of a suitable ratio between elastic and viscous characteristics of elastomeric copolymers in order to obtain, in rapid times, elastomeric compositions, i.e. one or more elastomeric copolymers mixed with a suitable filler or with a suitable mixture of fillers, maintaining, as indicated above, adaptability characteristics to the moulds.

In this respect, it is considered particularly important to reduce the mixing times, in order to obtain a reduction in the preparation costs of the elastomeric compositions through a better exploitation of the plants, without jeopardizing the dispersion degree of the filler or of the mixture of fillers.

One of the most important effects that can be observed during the dispersion phase of the filler or of the mixture of fillers, is the progressive decrease in the viscosity of the elastomeric compositions, generally expressed as the difference between the Mooney viscosity of the elastomeric compositions and the Mooney viscosity of the elastomeric copolymer(s) before incorporation of the filler or of the mixture of fillers ($\Delta$ Mooney). A non-optimal dispersion of the filler or of the mixture of fillers, in fact, causes a greater value of said difference (i.e. a greater $\Delta$ Mooney value) and consequently a lower processability of the elastomeric composition obtained.

Another and equally important effect of the optimum dispersion of the filler or of the mixture of fillers, is represented by minimizing phenomena that cause a high hysteresis of the elastomeric composition obtained, with particular reference to the interactions between the particles of the non-dispersed filler(s) which, in reciprocal contact, cause an increase in the dissipative mechanisms.

It is known that the main characteristics of elastomeric copolymers that influence the dispersion phase of the filler or of the mixture of fillers are: the structure (e.g., linear, branched, radial), the molecular weight, the molecular weights distribution and the optional presence of functional groups.

Elastomeric copolymers with a linear structure, for example, have a greater viscous component with respect to that of elastomeric copolymers with a radial structure and the latter, greater than that of elastomeric copolymers with a branched structure; whereas with an increase in the value of the molecular weights distribution index of elastomeric copolymers, the importance of the elastic component of the same increases.

The elastic component of elastomeric copolymers is important in the work transfer phenomenon from the machine to the elastomeric composition comprising one or more elastomeric polymers and filler or mixture of fillers: said elastic component however must not be excessive as, due to deformations imposed on the elastomeric copolymer(s), the latter can create breakage rather than flow phenomena (plastic deformation) with a consequent reduction in the work transfer efficiency from the machine to the elastomeric composition.

Efforts have been made in the art to obtain elastomeric copolymers having a good compatibility with fillers such as, for example, silica and/or carbon black, and therefore capable of giving elastomeric compositions with a high processability.

European patent application EP 754 710, for example, describes a process for the preparation of 1,3-butadiene copolymers that can be used for the production of tyres having a low rolling resistance characterized by: (a) anionic polymerization of styrene and 1,3-butadiene in the presence of a hydrocarbon solvent, of an initiator based on a lithium alkyl and of a polar modifier [for example, tetrahydrofuran (THF)], under inert conditions, at a temperature ranging from 0° C. to 150° C., preferably ranging from 20° C. to 120° C.; (b) followed by an optional reaction with up to 2% of a terminal monomer selected from 1,3-butadiene, styrene or another conjugated diene, or other vinyl aromatic compound; (c) followed by a coupling reaction of no more than 70% of star-shaped chains in the presence of a tin or silicon halide having formula $Cl_nMeR_{4-n}$ (I) wherein n represents a number from 3 to 4, Me is Si or Sn, and R is an organic radical of the alkyl, cycloalkyl or aryl type, selected from radicals having from 1 to 20 carbon atoms; (d) followed by an optional reaction with up to 2% of a terminal monomer selected from 1,3-butadiene, styrene or another conjugated diene, or other vinyl aromatic compound; (e) followed by a termination reaction of the linear chains with a compound of the type $ClSnR_3$ (II) wherein R is an organic radical of the alkyl, cycloalkyl or aryl type, selected from radicals having from 1 to 20 carbon atoms. In particular, the copolymer obtained by means of the above-mentioned process has a maximum of 70% of star-shaped polymeric chains and at least 30% of polymeric chains having a linear structure, wherein all the linear chains terminate with a tin atom. The styrene-butadiene (SBR) copolymer obtained is said to be also capable of not negatively influencing the remaining characteristics of the tyre, for example the skid resistance.

European patent application EP 818 478 describes a styrene-isoprene-butadiene (SIBR) elastomeric terpolymer and a process for its preparation. In particular, a process is described for the preparation of a styrene-isoprene-butadiene (SIBR) elastomeric terpolymer which comprises: (a) copolymerizing styrene, isoprene and butadiene in the presence of a hydrocarbon solvent, of an initiator selected from alkaline metal compounds (for example, n-butyl lithium) and of a vinylating agent [for example, tetrahydrofuran (THF)]; (b) reacting the terpolymer obtained in step (a) with a coupling agent (for example, silicon tetrachloride, tin tetrachloride); (c) reacting the coupled terpolymer obtained in step (b) with a compound having at least one functional group selected from the group consisting of >C=O, >C=S, amine, aziridine and epoxy groups, in its molecule, so as to modify at least a part of the terpolymer. The styrene-isoprene-butadiene (SIBR) copolymer obtained from the above-mentioned process is said to be capable of giving elastomeric compositions comprising silica having a good processability, a good tensile strength and a good abrasion resistance.

Patent application EP 1 274 737 describes a process for the preparation of conjugated diene-vinyl arene random elastomeric copolymers having a branched structure comprising: (1) anionic copolymerization in solution of conjugated diene monomers and vinyl arenes, in the presence of randomizing agents and of an initiator selected from the class of lithium alkyls, the copolymerization being carried out until the almost total disappearance of the monomers; (2) addition to the solution of step (1) of a quantity of lithium alkyl from 1 to 4 times the molar quantity of lithium alkyl of step (1); (3) addition to the polymeric solution of step (2) of a compound having general formula R—Br wherein R is a $C_1$-$C_{30}$ monofunctional hydrocarbyl radical selected from alkyl, cycloalkyl and aryl radicals, the molar ratio between R—Br and total lithium alkyl ranging from 0.6/1 to 1/1, thus obtaining a branched elastomeric copolymer. The above-mentioned conjugated diene-vinyl arene random elastomeric copolymers having a branched structure are said to have an improved processability and to be suitable for the production of tyres having a low rolling resistance.

The above processes, however, can have various drawbacks. Not all of the above processes, for example, are capable of giving copolymers having branching points randomly distributed along the axis of the copolymer and in any case, none of the above processes is capable of giving elastomeric copolymers that are contemporaneously functionalized and branched. Furthermore, at times, in the copolymers obtained with the above processes, the polymeric chains do not always have at least one functional group capable of interacting with the fillers.

The Applicant has therefore considered the problem of finding a process which allows functionalized and branched elastomeric copolymers to be obtained, i.e. elastomeric copolymers that are, contemporaneously, functionalized and branched, having branching points randomly distributed along the axis of the copolymer.

The Applicant has now found that the production of functionalized elastomeric copolymers, having branching points randomly distributed along the axis of the copolymer, can be obtained through a process which comprises anionic polymerization of at least one conjugated diene monomer and at least one vinyl arene, reacting at least 10% by weight of the polymeric chains present in the elastomeric copolymer obtained with at least one compound having at least one functional group, reacting the functionalized elastomeric copolymer obtained with at least one compound containing bromine. The functionalized and branched elastomeric copolymers thus obtained have a good compatibility with fillers such as, for example, silica, and are consequently able to give elastomeric compositions having a high processability. Furthermore, said elastomeric compositions, when used in the production of tyres, are capable of giving tyres having low rolling resistance and good wet skid resistance.

An object of the present invention therefore relates to a process for the preparation of a functionalized and branched elastomeric copolymer comprising the following steps:
(a) anionic copolymerization of at least one conjugated diene monomer and at least one vinyl arene, in the presence of at least one hydrocarbon solvent, of at least one lithium-based initiator, and of at least one polar modifier, obtaining a solution comprising an elastomeric copolymer;
(b) reacting at least 10% by weight, preferably from 20% by weight to 100% by weight, of the polymeric chains present in the elastomeric copolymer obtained in step (a) with at least one compound having at least one functional group selected from: epoxides, ketones, esters, aldehydes, obtaining a solution comprising a functionalized elastomeric copolymer;
(c) adding a quantity of lithium-based initiator to the solution obtained in step (b), from 1 to 4 times, preferably from 1.5 to 3 times, the molar quantity of lithium-based initiator used in step (a) and a compound of bromine having general formula (I):

R—Br                (I)

wherein R represents a linear or branched $C_1$-$C_{30}$, preferably $C_2$-$C_{10}$, alkyl group, a $C_3$-$C_{30}$, preferably $C_4$-$C_{10}$, cycloalkyl group, a $C_6$-$C_{30}$, preferably $C_6$-$C_{12}$, aryl group.

For the purposes of the present description and of the following claims, the definitions of the numerical ranges always comprise the extremes unless otherwise specified.

For the purposes of the present description and of the following claims, the term "comprising" also includes the terms "essentially consisting of" or "which consists of".

According to a preferred embodiment of the present invention, said conjugated diene monomer can be selected from: 1,3-butadiene, isoprene, 2,3-dimethyl-1,3-butadiene, 1,3 pentadiene (piperylene), 2-methyl-3-ethyl-1,3-butadiene, 1,3-octadiene, or mixtures thereof. 1,3-Butadiene, isoprene, or mixtures thereof are preferred. 1,3-Butadiene is particularly preferred.

According to a preferred embodiment of the present invention, said vinyl arene can be selected from: styrene, α-methylstyrene, 1-vinyl-naphthalene, 2-vinyl-naphthalene, or their alkyl derivatives, or mixtures thereof. Styrene is preferred.

According to a preferred embodiment of the present invention, said anionic copolymerization can be carried out in the presence of:
  60% by weight-95% by weight, preferably 70% by weight-90% by weight, with respect to the total weight of the conjugated diene monomer and vinyl arene, of at least one conjugated diene monomer; and
  5% by weight-40% by weight, preferably 10% by weight-30% by weight, with respect to the total weight of the conjugated diene monomer and vinyl arene, of at least one vinyl arene.

According to a preferred embodiment of the present invention, said hydrocarbon solvent can be selected from aliphatic or aromatic hydrocarbon solvents such as, for example, n-pentane, n-hexane, n-heptane, cyclohexane, or mixtures thereof. n-Hexane, cyclohexane, or mixtures thereof, are preferred.

The quantity of hydrocarbon solvent used in said anionic copolymerization step (a) is generally such as to allow the complete solubility of the monomers (i.e. conjugated diene monomer and vinyl arene), of the additives optionally present and of the elastomeric copolymer obtained at the end of the same, the complete stirring of the reaction mixture, also during said copolymerization, and the diffusion of the reaction heat. Said hydrocarbon solvent is preferably used in such a quantity as to have a concentration of monomers (i.e. conjugated diene monomer and vinyl arene) in the hydrocarbon solvent ranging from 1% by weight to 30% by weight with respect to the total weight of the hydrocarbon solvent.

According to a preferred embodiment of the present invention, said lithium-based initiator can be selected from compounds having general formula (II):

$$R'(Li)_n \qquad (II)$$

wherein R' represents a linear or branched $C_1$-$C_{20}$, preferably $C_2$-$C_8$, alkyl group, n is an integer ranging from 1 to 4.

According to a further preferred embodiment of the present invention, said lithium-based initiator can be selected, for example, from: lithium-n-butyl, lithium-n-propyl, lithium-isobutyl, lithium-t-butyl, lithium amyl, or mixtures thereof. Lithium-n-butyl is preferred.

According to a preferred embodiment of the present invention, said lithium-based initiator can be used in a quantity ranging from 0.005% by weight to 0.08% by weight, preferably ranging from 0.02% by weight to 0.06% by weight, with respect to the total weight of the monomers (i.e. conjugated diene monomer and vinyl arene).

In order to regulate the formation of an elastomeric copolymer with a random distribution of the conjugated diene monomers and of the vinyl arenes, said step (a), as mentioned above, can be carried out in the presence of at least one polar modifier.

According to a preferred embodiment of the present invention, said polar modifier can be selected, for example from: ethers, such as, for example, tetrahydrofuran (THF), tetrahydrofurfurylethyl ether (THFAethyl), or mixtures thereof; diamines such as, for example, N,N,N',N'-tetramethylethylenediamine (TMEDA), or mixtures thereof; or mixtures thereof. Tetrahydrofurfurylethyl ether (THFAethyl) is preferred.

According to a preferred embodiment of the present invention, said polar modifier can be used in a quantity ranging from 0.10 moles to 100 moles, preferably ranging from 0.20 moles to 50 mole, per mole of lithium-based initiator.

According to a preferred embodiment of the present invention, said step (a) can be carried out at a temperature ranging from 0° C. to 150° C., preferably ranging from 20° C. to 120° C. Said step (a) is in any case carried out at a temperature in which the monomers are maintained in liquid form.

According to a preferred embodiment of the present invention, said step (a) can be carried out for a time ranging from 5 minutes to 10 hours, preferably ranging from 10 minutes to 60 minutes.

As already indicated above, as the copolymerization of the conjugated diene monomer and vinyl arene, in the presence of the polar modifier, takes place randomly, the type of monomer at the chain-end can be controlled by reaction of the elastomeric copolymer obtained in step (a) with at least one reactive monomer ("capping") [step (a')]. Said reactive monomer is capable of reacting with the living polymeric species $P^-Li^+$ wherein P represents the linear chain of the conjugated diene monomer and vinyl arene elastomeric copolymer obtained in step (a). Preferably, said reactive monomer can be selected from 1,3-butadiene, styrene, α-methylstyrene. Preferably, said reactive monomer can be used in a quantity ranging from 0% by weight to 10% by weight, more preferably ranging from 0.1% by weight to 6% by weight, with respect to the total weight of the elastomeric copolymer obtained in step (a).

It should be noted that if the above capping reaction is carried out [step (a')], the copolymer obtained in said step (a') is subjected to the above step (b).

According to a preferred embodiment of the present invention, said epoxides can be selected, for example, from: 1,4-cyclohexanedimethanoldiglycidyl ether, neopentylglycoldiglycidyl ether, 1,6-hexane-dioldiglycidyl ether, trimethylolpropanetriglycidyl ether, propyleneglycoldiglycidyl ether, propylene oxide, 1,2-epoxybutane, 1,2-epoxyisobutane, 2,3-epoxybutane, 1,2-epoxyethane, 1,2-epoxyoctane, 1,2-epoxydecane, 1,2-epoxytetradecane, 1,2-epoxyhexadecane, 1,2-epoxyoctadecane, 1,2-epoxyeicosan, 1,2-epoxy-2-pentylpropane, 3,4-epoxy-1-butene, 1,2-epoxy-5-hexene, 1,2-epoxy-9-decene, 1,2-epoxycyclopentane, 1,2-epoxycyclohexane, 1,2-epoxycyclododecane, 1,2-epoxyethylbenzene, 1,2-epoxy-1-methoxy-2-methylpropane, methyl ether glycidyl, ethyl ether glycidyl, isopropyl ether glycidyl, butyl ether glycidyl, 2-(3,4-epoxycyclohexyl)ethyltrimethoxysilane, 3-glycidyloxypropyltrimethylsilane, or mixtures thereof.

According to a preferred embodiment of the present invention, said ketones can be selected, for example, from: acetone, benzophenone, aminoacetone, aminobenzophenone, acetylacetone, or mixtures thereof.

According to a preferred embodiment of the present invention, said esters can be selected, for example, from: methyl acetate, methyl adipate, ethyl adipate, methyl methacrylate, ethyl methacrylate, or mixtures thereof.

According to a preferred embodiment of the present invention, said aldehydes can be selected, for example, from: benzaldehyde, pyridine-aldehyde, formaldehyde, acetaldehyde, n-butyraldehyde, iso-butyraldehyde, propionaldehyde, iso-valeraldehyde, hexanaldehyde, heptanaldehyde, or mixtures thereof.

According to a preferred embodiment of the present invention, said compound having at least one functional group is selected from epoxides, and is more preferably 1,4-cyclohexanedimethanoldiglycidyl ether.

According to a preferred embodiment of the present invention, said step (b) can be carried out at a temperature ranging from 0° C. to 150° C., preferably ranging from 20° C. to 120° C.

According to a preferred embodiment of the present invention, said step (b) can be carried out for a time ranging from 1 minute to 1 hour, preferably ranging from 5 minutes to 0.5 hours.

According to a preferred embodiment of the present invention, said bromine compound having general formula (I) can be selected, for example, from: 1-bromo-methane, 1-bromo-ethane, 1-bromo-octane, 1-bromo-cyclohexane, 1-bromo-benzene, or mixtures thereof. 1-Bromo-octane is preferred.

According to a preferred embodiment of the present invention, said bromine compound having general formula (I) can be in such a quantity that the molar ratio between said bromine compound having general formula (I) and said total lithium-based initiator [lithium-based initiator of step (a)+lithium-based initiator of step (c)] ranges from 0.6:1 to 1:1, preferably ranges from 0.7:1 to 0.9:1.

According to a preferred embodiment of the present invention, said step (c) can be carried out at a temperature ranging from 0° C. to 150° C., preferably ranging from 20° C. to 120° C.

According to a preferred embodiment of the present invention, said step (c) can be carried out for a time ranging from 1 minute to 1 hour, preferably ranging from 5 minutes to 0.5 hours.

At the end of the process object of the present invention, a solution comprising a functionalized and branched elastomeric copolymer is obtained in which at least 10% of the polymeric chains present have at least one functional group, preferably of the terminal type, and having branching points (or nodes) randomly distributed along the axis of the macromolecule. The presence of these functional groups, preferably in terminal position, allows a better interaction with the fillers, in particular with silica, whereas the presence of said branching points (or nodes) randomly distributed along the axis of the macromolecule is extremely important from a rheological point of view as it allows an improved processability.

At the end of the process object of the present invention, a functionalized and branched styrene-1,3-butadiene (SBR) copolymer is preferably obtained, wherein the styrene units and the different butadienyl (1,4-cis, 1,4-trans and 1,2) units are randomly distributed along the chain.

The functionalized and branched elastomeric copolymer obtained at the end of the process object of the present invention, can be recovered from the solution obtained in step (c) by means of techniques known in the art, such as, for example, evaporation of the solvent, precipitation with non-solvent, subsequent filtration and drying.

The process object of the present invention can be carried out batchwise, or in continuous, preferably batchwise.

When said process is carried out batchwise, the diene monomer and the vinyl arene, the hydrocarbon solvent and the polar modifier, are introduced into an adiabatic polymerization reactor. The anionic copolymerization is then triggered using a lithium-based initiator. Upon complete conversion of the monomers, the compound having at least one functional group is introduced into the polymerization reactor and a further aliquot of lithium-based initiator and the bromine compound having general formula (I) are then introduced into the polymerization reactor, obtaining a solution from which the functionalized and branched elastomeric copolymer is separated, operating as indicated above. The operating temperatures and the reaction times are those specified above for steps (a)-(c).

When said process is carried out in continuous, the diene monomer and vinyl arene, the hydrocarbon solvent and the polar modifier are introduced into the first of a series of polymerization reactors (with n≥2), generally reactors of the CSTR type, together with a suitable quantity of lithium-based initiator. The configuration of the polymerization reactors (i.e. temperature, residence times) is optimized so as to guarantee, at the outlet of the n-1th polymerization reactor, the complete conversion of the monomers. At this point, a flow of compound having at least one functional group is introduced into the polymerization reactor, with continuity: the mixing of this flow with the polymeric solution must be carried out with suitable expedients in order to obtain complete homogeneity. A further flow of lithium-based initiator and a flow of bromine compound having general formula (I) are then introduced, with continuity, at the outlet of the polymerization reactor: also in this case, the mixing of the flows fed with the polymeric solution must be carried out with suitable expedients in order to obtain complete homogeneity. The polymeric solution thus obtained is fed to the n-th polymerization reactor, with residence times of about 30 minutes: the functionalized and branched elastomeric copolymer is separated from the solution obtained, at the outlet of the n-th polymerization reactor, operating as indicated above. The operating temperatures and the reaction times are those specified above for steps (a)-(c).

As mentioned above, the functionalized and branched elastomeric copolymer obtained with the process object of the present invention, can be advantageously used in vulcanizable elastomeric compositions, optionally in the presence of other (co)polymers, for producing vulcanized end-products having improved physico/mechanical properties.

Said functionalized and branched elastomeric copolymer, for example, can be used, in a mixture with silica and/or carbon black, as component of vulcanizable elastomeric compositions suitable for the preparation of tyres having a low rolling resistance and a good wet skid resistance.

A further object of the present invention therefore relates to a vulcanizable elastomeric composition comprising at least one functionalized and branched elastomeric copolymer obtained as described above, at least one filler selected from silica, carbon black, or mixtures thereof, preferably silica, and at least one vulcanizing agent. Said filler is preferably present in said vulcanizable elastomeric composition in a quantity ranging from 5 phr to 500 phr.

In addition to said functionalized and branched elastomeric copolymer, said vulcanizable elastomeric composition can comprise other elastomers such as, for example, natural rubber (NR), polybutadiene (BR), or mixtures thereof.

For the purposes of the present invention and of the following claims, the term "phr" indicates the parts by weight of a certain component per 100 parts by weight of (co)polymer(s) present in the vulcanizable elastomeric composition.

Said vulcanizing agent can be selected, for example, from elemental sulfur, soluble or insoluble, or from sulfur donors, or mixtures thereof.

Sulfur donors are, for example, dimorpholyl disulfide (DTDM), 2-morpholine-dithiobenzothiazole (MBSS), disulfide of caprolactam, dipentamethylenethiuram tetrasulfide (DPTT), tetramethylthiuram disulfide (TMTD), or mixtures thereof.

If the vulcanizing agent is selected from sulfur or sulfur donors, in order to increase the vulcanization yield, it can be also advantageous to use other additives (e.g. accelerating agents), such as, for example, dithiocarbamates, thiurams, thiazoles, sulfenamides, xanthogenates, guanidine derivates, caprolactams, thiourea derivatives or mixtures thereof.

In said vulcanizable elastomeric composition, said sulfur, and/or said sulfur donors, and/or said other additives indicated above, optionally present, are generally present in a quantity ranging from 0.05 phr to 10 phr, preferably ranging from 0.1 phr to 8 phr.

Other compounds can be added to the vulcanizable elastomeric compositions object of the present invention.

Inorganic or organic compounds can be added, for example. Examples of these compounds are: zinc oxide; zinc carbonate; lead oxide; saturated or unsaturated organic fatty acids, or their zinc salts; polyalcohols; amine alcohols (e.g., triethanolamine); amines (e.g., dibutylamine, dicyclohexylamine, cyclohexylethylamine); polyether amines; or mixtures thereof.

Vulcanization inhibitors can also be added, such as, for example, N-cyclohexyl-thiophthalimide (PVI), N,N'-dinitrosopentamethylene-tetramine (DNPT), phthalic anhydride (PTA), diphenylnitrosamine, or mixtures thereof.

In addition to the above-mentioned vulcanizing agents and/or other compounds indicated above, the vulcanizable elastomeric composition object of the present invention, can comprise other additional additives usually used in elastomeric compositions and known to experts in the field such as, for example, other fillers, filler activators, ozone protection agents, aging inhibitors, antioxidants, processing aids, extender oils, plasticizers, reinforcing materials, mould releasing agents.

Other fillers which can be used for the purposes of the present invention are, for example: barium sulfate, titanium dioxide, zinc oxide, calcium oxide, calcium carbonate, magnesium oxide, aluminum oxide, iron oxide, aluminum hydroxide, magnesium hydroxide, aluminum silicates, diatomaceous earth, talc, kaolins, bentonites, carbon nanotubes, Teflon® in powder form), silicates, or mixtures thereof. The total quantity of fillers in any case ranges from 5 phr to 500 phr.

Filler activators which can be used for the purposes of the present invention are, for example: organic silanes such as, for example, bis(triethoxysilylpropyl)polysulfide, vinyltrimethyloxysilane, vinyldimethoxymethylsilane, vinyltriethoxysilane, vinyltris-(2-methoxyethoxy)silane, N-cyclohexyl-3-aminopropyl-trimethoxysilane, 3-aminopropyltrimethoxysilane, methyltrimethoxysilane, methyltriethoxysilane, dimethyldimethoxysilane, dimethyldiethoxysilane, trimethylethoxysilane, isooctyltrimethoxysilane, isooctyltriethoxysilane, hexadecyltrimethoxysilane, (octadecyl)methyldimethoxysilane, or mixtures thereof. Further filler activators are, for example, surfactants such as triethanolamine, ethylenglycols, or mixtures thereof. The quantity of filler activators generally ranges from 0 phr to 10 phr.

A further object of the present invention relates to a vulcanized end-product obtained from the vulcanization of said vulcanizable elastomeric compositions.

Some illustrative and non-limiting examples are provided hereunder for a better understanding of the present invention and for it embodiment.

EXAMPLES

The characterization and analysis techniques indicated hereunder were used.

The styrene-1,3-butadiene (SBR) copolymers obtained were characterized using the techniques described hereunder: the results obtained are reported in Table 1.

Analysis of the Microstructure (Content of 1,2-vinyl Units and Bound Styrene)

The determination of the microstructure (content of 1,2-vinyl units and of bound styrene) was carried out by means of FTIR (Fourier Transform Infra Red) spectroscopy by means of absorption bands (and calculation of their relative intensity) characteristic of the three types of butadiene chaining: 1,4-cis (800 $cm^{-1}$ and 640 $cm^{-1}$), 1,4-trans (1018 $cm^{-1}$ and 937 $cm^{-1}$) and 1,2 (934 $cm^{-1}$ and 887 $cm^{-1}$) and bound styrene (from 715 $cm^{-1}$ to 680 $cm^{-1}$).

Determination of the Molecular Mass Distribution (MWD)

The determination of the molecular mass distribution (MWD) was obtained by means of gel permeation chromatography (GPC) which was carried out by passing a solution in tetrahydrofuran (THF) of the copolymer obtained over a series of columns containing a solid phase consisting of crosslinked polystyrene having variably sized porosities.

Determination of the Mooney Viscosity

The determination of the Mooney Viscosity was carried out at 100° C. using a Monsanto MV2000E Viscometer, method ASTM D1646 with a rotor of the L type and with times 1+4 ($ML_{1+4}$@100° C.)

Determination of the Glass Transition Temperature ($T_g$)

The determination of the glass transition temperature ($T_g$) was carried out by means of Differential Scanner Calorimetry (DSC).

The mechanical dynamic characteristics of the vulcanized elastomeric compositions obtained were determined using a Rheometrics® RDA2 rheometer, carrying out the tests indicated below: the results obtained are reported in Table 3.

Dynamic Strain Sweep (tan δ@ 60° C.—rolling resistance) in configuration:
Frequency: 10 Hz
Temperature: 0° C. and 60° C.
Strain Range: 0.1%÷10%
Geometry: rectangular torsion.

Dynamic Temperature Sweep (tan δ@ 0° C.—wet grip) in configuration:
Temperature Range: −130° C.÷100° C. @ 2° C./min
Frequency: 1 Hz
Strain: 0.1%
Geometry: rectangular torsion
Cooling: 3° C./min.

The determination of the Mooney Viscosity of the non-vulcanized elastomeric compositions was carried out at 100° C. using a Monsanto MV2000E Viscometer, method ASTM D1646 with a rotor of the L type and with times 1+4 ($ML_{1+4}$@100° C.): the results obtained are reported in Table 3.

The tensile characteristics of the vulcanized elastomeric compositions were determined by applying the standard ISO 37 and using an Instron dynamometer: the results obtained are reported in Table 3.

The Shore A hardness was determined using the standard ISO 7619: the results obtained are reported in Table 2.

Example 1 (Comparative)

8,000 g of an anhydrous mixture of cyclohexane/n-hexane in a weight ratio of 9/1, equal to a filling factor of 80%, 3.22 g of polar modifier (tertrahydrofurfurylethyl ether—THFA-ethyl), corresponding to 350 ppm, in a molar ratio of approx. 3:1 with the theoretical quantity of initiator, followed by 300 g of styrene and 900 g of 1,3-butadiene, were charged into a 16 liter stirred reactor. The reaction mixture obtained was heated to a temperature of 40° C. by means of a heating jacket. 0.48 g of lithium n-butyl in n-hexane (3.2 g of a solution at 15% by weight) were then added. The heating of the jacket was then excluded and the temperature increase of the reaction mass was obtained as a result of the exothermic nature of the reaction, up to a final temperature (peak temperature) of about 78° C. 10 minutes were allowed to pass after reaching the peak temperature, in order to complete the conversion of free monomers, 0.159 g of silicon tetrachloride, corresponding to a theoretical coupling efficiency of 50%, were then added. After 5 minutes, 0.405 g of trimethylchloride silane were added to deactivate the residual living chain-ends. The solution obtained was discharged, after 10 minutes, into a tank where it was stabilized with 0.7 phr of 2,6-di-t-butylphenol (BHT) and the whole mixture was sent to the desolventizing section by stripping with water.

Example 2 (Comparative)

8,000 g of an anhydrous mixture of cyclohexane/n-hexane in a weight ratio of 9/1, equal to a filling factor of 80%, 3.22 g of polar modifier (tetrahydrofurfurylethyl ether—THFA-ethyl), corresponding to 350 ppm, in a molar ratio of approx. 3:1 with the theoretical quantity of initiator, followed by 300 g of styrene and 900 g of 1,3-butadiene, were charged into a 16 liter stirred reactor. The reaction mixture obtained was heated to a temperature of 40° C. by means of a heating jacket. 0.48 g of lithium n-butyl in n-hexane (3.2 g of a solution at 15% by weight) were then added. The heating of the jacket was then excluded and the temperature increase of the reaction mass was obtained as a result of the exothermic nature of the reaction, up to a final temperature (peak temperature) of about 78° C. 10 minutes were allowed to pass after reaching the peak temperature, in order to complete the conversion of free monomers, 0.84 g of lithium n-butyl (5.6. g of a solution at 15% by weight) were then added together with 2.784 g of 1-bromo-octane, in order to introduce random branchings onto the linear polymer previously obtained. The solution obtained was discharged, after 10 minutes, into a tank where it was stabilized with 0.7 phr of 2,6-di-t-butylphenol (BHT) and the whole mixture was sent to the desolventizing section by stripping with water.

Example 3 (Comparative)

8,000 g of an anhydrous mixture of cyclohexane/n-hexane in a weight ratio of 9/1, equal to a filling factor of 80%, 3.22 g of polar modifier (tertrahydrofurfurylethyl ether—THFA-ethyl), corresponding to 350 ppm, in a molar ratio of approx. 3:1 with the theoretical quantity of initiator, followed by 300 g of styrene and 900 g of 1,3-butadiene, were charged into a 16 liter stirred reactor. The reaction mixture obtained was heated to a temperature of 40° C. by means of a heating jacket. 0.48 g of lithium n-butyl in n-hexane (3.2 g of a solution at 15% by weight) were then added. The heating of the jacket was then excluded and the temperature increase of the reaction mass was obtained as a result of the exothermic nature of the reaction, up to a final temperature (peak temperature) of about 78° C. 10 minutes were allowed to pass after reaching the peak temperature, in order to complete the conversion of free monomers, and 0.111 g of silicon tetrachloride, corresponding to a theoretical coupling efficiency of 35%, were then added. After 5 minutes, 0.42 g of 1,4-cyclohexanedimethanoldiglycidyl ether were added which reacts with the living chain-ends, functionalizing them. The solution obtained was discharged, after 10 minutes, into a tank where it was stabilized with 0.7 phr of 2,6-di-t-butylphenol (BHT) and the whole mixture was sent to the desolventizing section by stripping with water.

Example 4 (Invention)

8,000 g of an anhydrous mixture of cyclohexane/n-hexane in a weight ratio of 9/1, equal to a filling factor of 80%, 3.22 g of polar modifier (tertrahydrofurfurylethyl ether—THFA-ethyl), corresponding to 350 ppm, in a molar ratio of approx. 3:1 with the theoretical quantity of initiator, followed by 300 g of styrene and 900 g of 1,3-butadiene, were charged into a 16 liter stirred reactor. The reaction mixture obtained was heated to a temperature of 40° C. by means of a heating jacket. 0.48 g of lithium n-butyl in n-hexane (3.2 g of a solution at 15% by weight) were then added. The heating of the jacket was then excluded and the temperature increase of the reaction mass was obtained as a result of the exothermic nature of the reaction, up to a final temperature (peak temperature) of about 78° C. 10 minutes were allowed to pass after reaching the peak temperature, in order to complete the conversion of free monomers, and 0.84 g of 1,4-cyclohexanedimethanoldiglycidyl ether were then added, corresponding to the stoichiometric reaction between the epoxy groups of the same compound and the reactive carbanionic chain-ends of the polymer. After 5 minutes, 0.84 g of lithium n-butyl (5.6 g of a solution at 15% by weight) were added together with 2.784 g of 1-bromo-octane, in order to introduce random branchings onto the linear polymer previously obtained. The solution obtained was discharged, after 10 minutes, into a tank where it was stabilized with 0.7 phr of 2,6-di-t-butylphenol (BHT) and the whole mixture was sent to the desolventizing section by stripping with water.

TABLE 1

|  | Example 1 | Example 2 | Example 3 | Example 4 |
|---|---|---|---|---|
| $ML_{1+4}@100°$ C. | 63 | 68 | 59 | 68 |
| styrene (%) | 20.8 | 22.7 | 21.4 | 22.3 |
| vinyl (%) | 66 | 65.4 | 64 | 66 |
| $T_g$ (° C.) | −20.5 | −21 | −23.5 | −22 |
| MW ($P_1$) (kdalton) | 165 | 175 | 150 | 162 |
| $P_n$ (%) | 51 | 42 | 58 | 42 |

Examples 5-8

Preparation of the Elastomeric Compositions

The elastomeric compositions were prepared in a 1.6 liter internal mixer of the Banbury type according to the formulation described in Table 2.

The mixing cycle for the formulation indicated in Table 2 has the following characteristics:
initial temperature: 50° C.;
cycles 1/2/3: 6+5+2 minutes;
final temperature: 100° C.

The acceleration of the elastomeric composition was carried out in an internal mixer of the Banbury type and subsequently for 3 minutes in a calender.

The samples were then vulcanized at 160° C. following the Standard ISO 6502.

TABLE 2

| INGREDIENTS | phr |
|---|---|
| SBR | 103 |
| BR | 25 |
| Silica | 78 |
| N 234 | 6 |
| Silane | 6.2 |
| Vivatec ® 500 | 6 |
| ZnO | 3 |
| Stearic acid | 2 |
| 6-PPD | 1.5 |
| Paraffinic wax | 1.5 |
| DPG | 0.5 |
| CBS | 1.5 |
| TBzTD | 0.2 |
| Sulfur | 2.1 |

SBR: styrene-1,3-butadiene copolymers obtained as described above in Examples 1-4;
BR: cis-1,4-polybutadiene [Europrene® Neocis BR40—Polimeri Europa (now versalis spa)];
Silica: Ultrasil® 7000 (Evonik);
N234: carbon black;

Silane: bis(triethoxysilylpropyl)polysulfide (Si 75®—Evonik);
Vivatec ® 500: aromatic oil [TDAE ("Treated Distillated Aromatic Extract)—BP];
6-PPD (antioxidant): N-(1,3-dimethylbutyl)-N'-phenyl-p-phenylenediamine (Santoflex® 13—Monsanto);
Paraffinic wax: Riowax® 721 (Andrea Gallo Di Luigi s.r.l.);
DPG (accelerating agent): diphenyl guanidine (Rhenogran® DPG80—Rhein Chemie);
CBS (accelerating agent): N-cyclohexyl-2-benzothiazyl-sulfenamide (Vulkacit® CZ—Bayer);
TBzTD (accelerating agent): N,N,N',N'-tetrabenzyl thiuram disulfide (IsoQure® TBzTD Kautshuck Gesellschaft Group).

TABLE 3

|  | EXAMPLE 5 | EXAMPLE 6 | EXAMPLE 7 | EXAMPLE 8 |
|---|---|---|---|---|
| $ML_{1+4}$@100° C. | 103 | 103 | 97 | 100 |
| Δ Mooney | 40 | 35 | 38 | 32 |
| t90 (min) | 19.1 | 16.9 | 16 | 18.6 |
| Modulus 300% (MPa) | 14.2 | 13.9 | 14.5 | 14.3 |
| Stress at break (MPa) | 17.5 | 17.1 | 17.5 | 17.7 |
| Elongation at break (MPa) | 360 | 345 | 360 | 370 |
| Hardness (Shore A) | 65 | 68 | 67 | 68 |
| tan δ 0° C. | 0.152 | 0.155 | 0.163 | 0.185 |
| tan δ 60° C. | 0.164 | 0.190 | 0.164 | 0.154 |

From the data reported in Table 3, it can be deduced that the styrene-1,3-butadiene (SBR) copolymer obtained according to the present invention (Example 4) is capable of giving better results with respect to the physical and dynamic-mechanical characteristics of the vulcanized elastomeric compositions, in particular as far as the rolling resistance (lower tan δ value at 60° C. as indicated in Example 8) and the wet skid resistance (higher tan δ value at 0° C. as indicated in Example 8) are concerned. Furthermore, the lower Δ Mooney value of the non-vulcanized elastomeric composition for polymers characterized by the presence of random branchings [Example 2 (comparative) and Example 4 (invention)] indicate an improved processability of the elastomeric composition.

The invention claimed is:

1. A process for the preparation of a functionalized and branched elastomeric copolymer comprising the following steps:
   (a) anionic copolymerization of at least one conjugated diene monomer and at least one vinyl arene, in the presence of at least one hydrocarbon solvent, of at least one lithium-based initiator, and of at least one polar modifier, obtaining a solution comprising an elastomeric copolymer;
   (b) reacting at least 10% by weight of the polymeric chains present in the elastomeric copolymer in step (a) with at least one compound having at least one functional group selected from: epoxides, ketones, esters, aldehydes, obtaining a solution comprising a functionalized elastomeric copolymer;
   (c) adding a quantity of lithium-based initiator to the solution obtained in step (b), from 1 to 4 times the molar quantity of lithium-based initiator used in step (a) and a compound of bromine having general formula (I):

R—Br    (I), wherein R represents a linear or branched C1-C30 alkyl group, a C3-C30 cycloalkyl group, a C6-C30 aryl group,
   wherein a functionalized and branched elastomeric copolymer is obtained in which the functionalization of the polymeric chains is of the terminal type.
2. The process according to claim 1, wherein, in step (b), from 20% by weight to 100% by weight of the polymeric chains present in the elastomeric copolymer obtained in step (a) are reacted.
3. The process according to claim 1, wherein said conjugated diene monomer is selected from: 1,3-butadiene, isoprene, 2,3-dimethyl-1,3-butadiene, 1,3-pentadiene (piperylene), 2-methyl-3-ethyl-1,36-butadiene, 1,3-octadiene, or mixtures thereof.
4. The process according to claim 1, wherein said vinyl arene is selected from: styrene, α-methylstyrene, 1-vinyl-naphthalene, 2-vinyl-naphthalene, or their alkyl derivatives, or mixtures thereof.
5. The process according to claim 1, wherein said anionic copolymerization is carried out in the presence of:
   (a) 60% by weight-95% by weight with respect to the total weight of the conjugated diene monomer and vinyl arene, of at least one conjugated diene monomer; and
   (b) 5% by weight-40% by weight with respect to the total weight of the conjugated diene monomer and vinyl arene, of at least one vinyl arene.
6. The process according to claim 1, wherein said hydrocarbon solvent is an aliphatic or aromatic hydrocarbon solvent selected from n-pentane, n-hexane, n-heptane, cyclohexane, or mixtures thereof.
7. The process according to claim 1, wherein said lithium-based initiator is selected from compounds having general formula (II):

R'(Li)n    (II)

wherein R' represents a linear or branched C1-C20 alkyl group, n is an integer ranging from 1 to 4.
8. The process according to claim 1, wherein said lithium-based initiator of step a) is used in a quantity ranging from 0.005% by weight to 0.08% by weight with respect to the total weight of the conjugated diene monomer and vinyl arene.
9. The process according to claim 1, wherein said polar modifier is selected from tetrahydrofuran (THF), tetrahydrofurfurylethyl ether (THFAethyl), or mixtures thereof; N,N,N',N'-tetramethylethylenediamine (TMEDA), or mixtures thereof; or mixtures thereof.
10. The process according to claim 1, wherein said polar modifier is used in a quantity ranging from 0.10 moles to 100 moles per mole of lithium-based initiator.
11. The process according to claim 1, wherein said step (a) is carried out at a temperature ranging from 0° C. to 150° C.
12. The process according to claim 1, wherein said step (a) is carried out for a time ranging from 5 minutes to 10 hours.
13. The process according to claim 1, wherein said compound having at least one functional group is selected from epoxides.
14. The process according to claim 1, wherein said step (b) is carried out at a temperature ranging from 0° C. to 150° C.
15. The process according to claim 1, wherein said step (b) is carried out for a time ranging from 1 minute to 1 hour.
16. The process according to claim 1, wherein said compound of bromine having general formula (I) is used in such a quantity that the molar ratio between said bromine compound having general formula (I) and total lithium-based initiator, the lithium-based initiator of step (a) and the lithium-based initiator of step (c), ranges from 0.6:1 to 1:1.

17. The process according to claim 1, wherein said step (c) is carried out at a temperature ranging from 0° C. to 150° C.

18. The process according to claim 1, wherein said step (c) is carried out for a time ranging from 1 minute to 1 hour.

19. A vulcanizable elastomeric composition comprising at least one functionalized and branched elastomeric copolymer obtained according to claim 1, at least one filler selected from silica, carbon black, or mixtures thereof, and at least one vulcanizing agent.

20. A vulcanized end-product obtained from the vulcanization of the elastomeric composition according to claim 19.

* * * * *

UNITED STATES PATENT AND TRADEMARK OFFICE
CERTIFICATE OF CORRECTION

PATENT NO. : 9,534,071 B2
APPLICATION NO. : 14/404703
DATED : January 3, 2017
INVENTOR(S) : Luca Soddu It is certified that error appears in the above-identified patent and that said Letters Patent is hereby corrected as shown below:

In the Specification

A second error occurs in Column 9, Line 21, which currently reads:
Teflon® in powder form), silicates, or mixtures thereof. The
Should read:
Teflon® (preferably in powder form), silicates, or mixtures thereof. The In the Claims In Column 14, Lines 11-15, Claim 3 currently reads:
3. The process according to claim 1, wherein said conjugated diene monomer is selected from:
1,3-butadiene, isoprene, 2,3-dimethyl-1,3-butadiene, 1,3-pentadiene (piperylene),
2-methyl-3-ethyl-1,36-butadiene, 1,3-octadiene, or mixtures thereof.
Should read:
3. The process according to claim 1, wherein said conjugated diene monomer is selected from:
1,3-butadiene, isoprene, 2,3-dimethyl-1,3-butadiene, 1,3-pentadiene (piperylene),
2-methyl-3-ethyl-1,3-butadiene, 1,3-octadiene, or mixtures thereof.

Signed and Sealed this
Fourteenth Day of November, 2017

Joseph Matal
*Performing the Functions and Duties of the*
*Under Secretary of Commerce for Intellectual Property and*
*Director of the United States Patent and Trademark Office*